United States Patent [19]
Wu

[11] Patent Number: 5,884,983
[45] Date of Patent: Mar. 23, 1999

[54] AXLE EXTENSION ASSEMBLY FOR A BICYCLE

[76] Inventor: Chin-Chang Wu, No. 19, Lane 108, Yungfeng Rd., Taiping City, Taichung Hsien, Taiwan

[21] Appl. No.: 899,845

[22] Filed: Jul. 24, 1997

[51] Int. Cl.⁶ .................................................. B60B 35/00
[52] U.S. Cl. ..................................... 301/124.1; 301/110.5
[58] Field of Search ................................ 301/110.5, 128, 301/124.1; 280/165, 291

[56] References Cited

U.S. PATENT DOCUMENTS

| | | | |
|---|---|---|---|
| 555,648 | 3/1896 | Latta | 301/110.5 |
| 3,484,829 | 12/1969 | Erickson | 280/291 |
| 4,183,418 | 1/1980 | Dudas | 301/124.1 |

FOREIGN PATENT DOCUMENTS

| | | | |
|---|---|---|---|
| 480242 | 4/1953 | Italy | 280/291 |
| 8778 | 4/1898 | United Kingdom | 280/291 |

*Primary Examiner*—D. Glenn Dayoan
*Assistant Examiner*—Long Bao Nguyen
*Attorney, Agent, or Firm*—Kolisch Hartwell Dickinson McCormack & Heuser

[57] ABSTRACT

A axle extension assembly is rotatably mounted to an axle of a wheel hub and includes a base member mounted to the axle with a nut threadedly engaged to the axle, a ring member rotatably mounted to the base member and a tube fixedly connected to the base member. The base member has an outer threaded periphery defined in a first end thereof so as to threadedly connect the tube and a protrusion portion extending radially and outwardly from a second end of the base member. A plain section is defined between the outer threaded periphery and the protrusion portion so that the ring member is rotatably mounted thereon.

5 Claims, 4 Drawing Sheets

AXLE EXTENSION ASSEMBLY FOR A BICYCLE

BACKGROUND OF THE INVENTION

1. Field of the Invention

The present invention relates to a axle extension assembly for a bicycle and, more particularly, to a axle extension assembly rotatably mounted to an axle of a front wheel hub and/or the rear wheel hub.

2. Brief Description of the Prior Art

Referring to FIG. 1 and 2, pegs 50 are popular accessories for a bicycle, which are tubular members and securely and respectively mounted to both ends of an axle 11 of a front wheel hub 10 and/or a rear wheel hub 10' of the bicycle so that a rider can skillfully utilize the peg(s) 50 of the bicycle to slide on a ramp 60 or the like. The axle 11 of the front wheel hub 10, extends from both ends of the front wheel hub 10 and into a first end of the corresponding peg 50 to engage with a nut 52 so that both ends of the axle 11 extending from the front wheel hub 10 have the corresponding peg 50 fixedly connected thereto. Each of the pegs 50 has an outer serrated peripheral surface which is designed for the rider to step thereon when performing a special stunt. However, the outer serrated peripheral surface of the pegs 50 will be come worn out if the pegs are slid on the ramp 60 frequently, and this may perhaps result in a slipping of the rider's feet from the pegs 60.

The present invention intends to provide an improved axle extension assembly which is rotatably mounted to at least one of two ends of the axle of the wheel hubs so as to mitigate and/or obviate the above-mentioned problems.

SUMMARY OF THE INVENTION

The present invention provides a axle extension assembly rotatably mounted to an axle of a wheel hub of a bicycle and comprising a base member having a first end with a first hole defined therein and a second end with a second hole defined therein which communicates with the first hole and receives the axle therein, a nut threadedly engaged with the axle so as to fixedly connect the base member to the axle, the first end of the base member having an outer threaded periphery defined therein and a protrusion portion extending radially and outwardly from the base member opposite to the outer threaded periphery, a plain section defined between the outer threaded periphery and the protrusion portion wherein the plain section has a smooth outer periphery.

A ring member is rotatably mounted to the plain section of the base member and a tube is threadedly engaged to the outer threaded periphery so that the ring member is rotatably retained between the tube and the protrusion portion.

It is an object of the present invention to provide a axle extension assembly which has a rotatable ring member.

It is another object of the present invention to provide a axle extension assembly having a ring member which is able to roll on a ramp.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
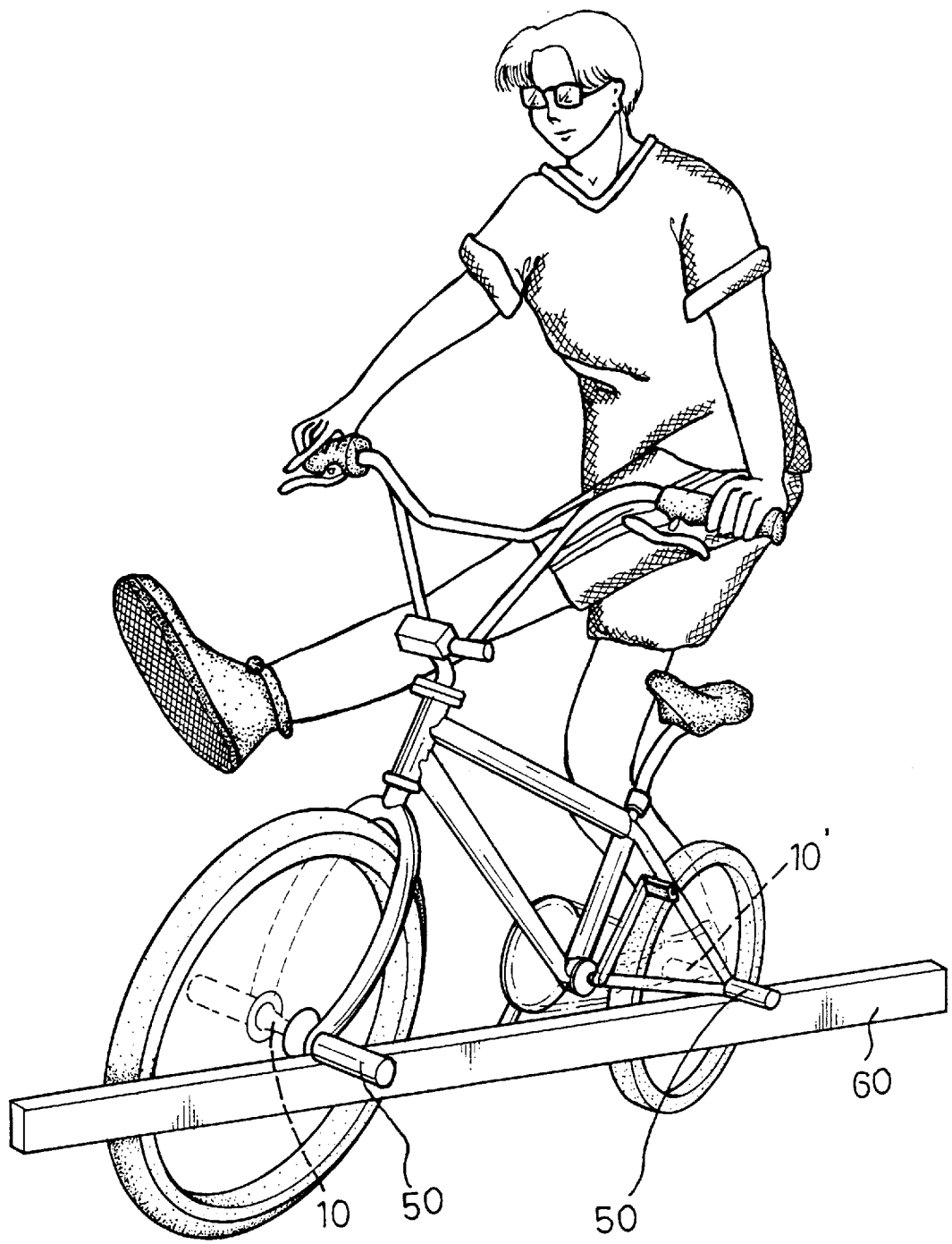
FIG. 1 is a perspective view to show conventional pegs disposed to a bicycle are sliding on a ramp.
Figure 2:
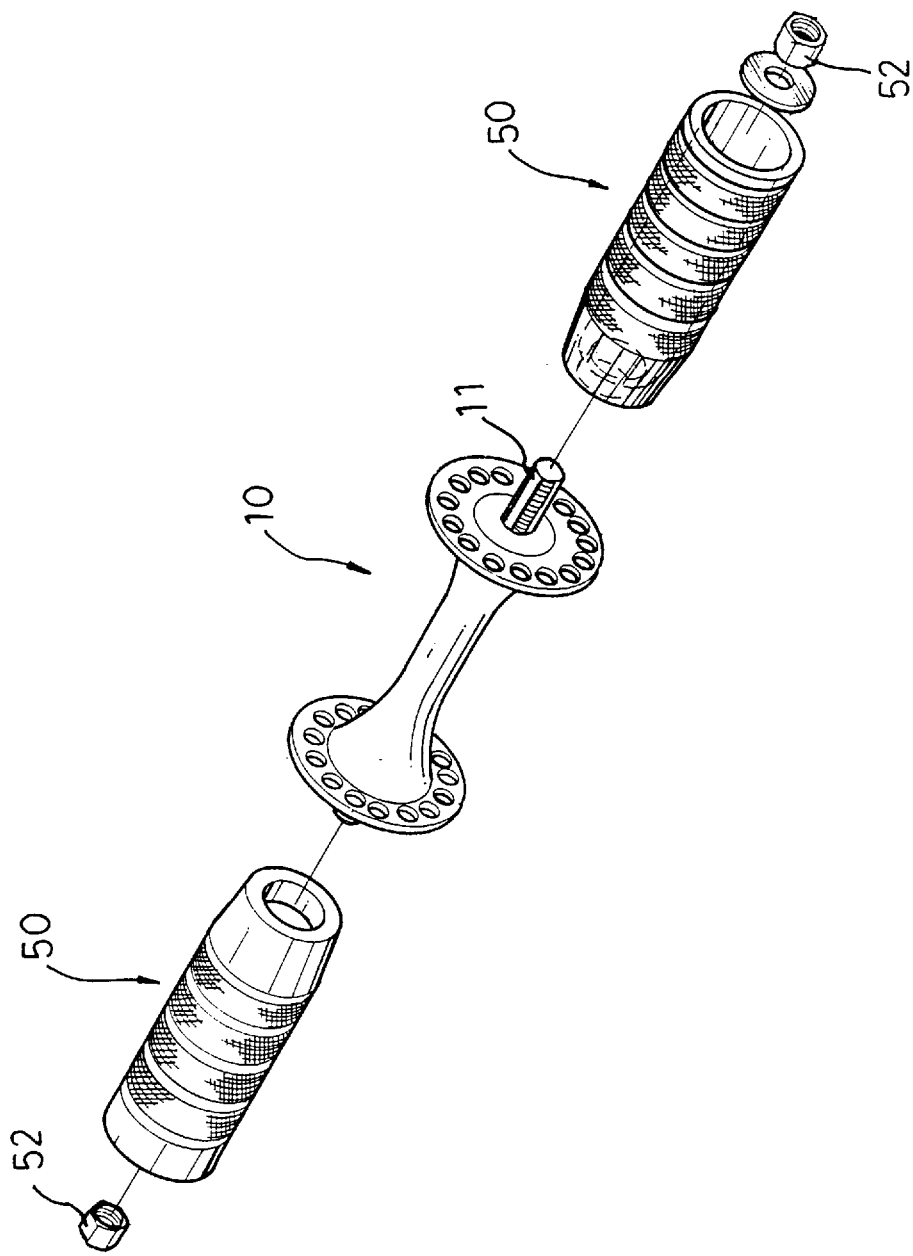
FIG. 2 is an exploded view of the conventional pegs and the wheel hub.
Figure 3:
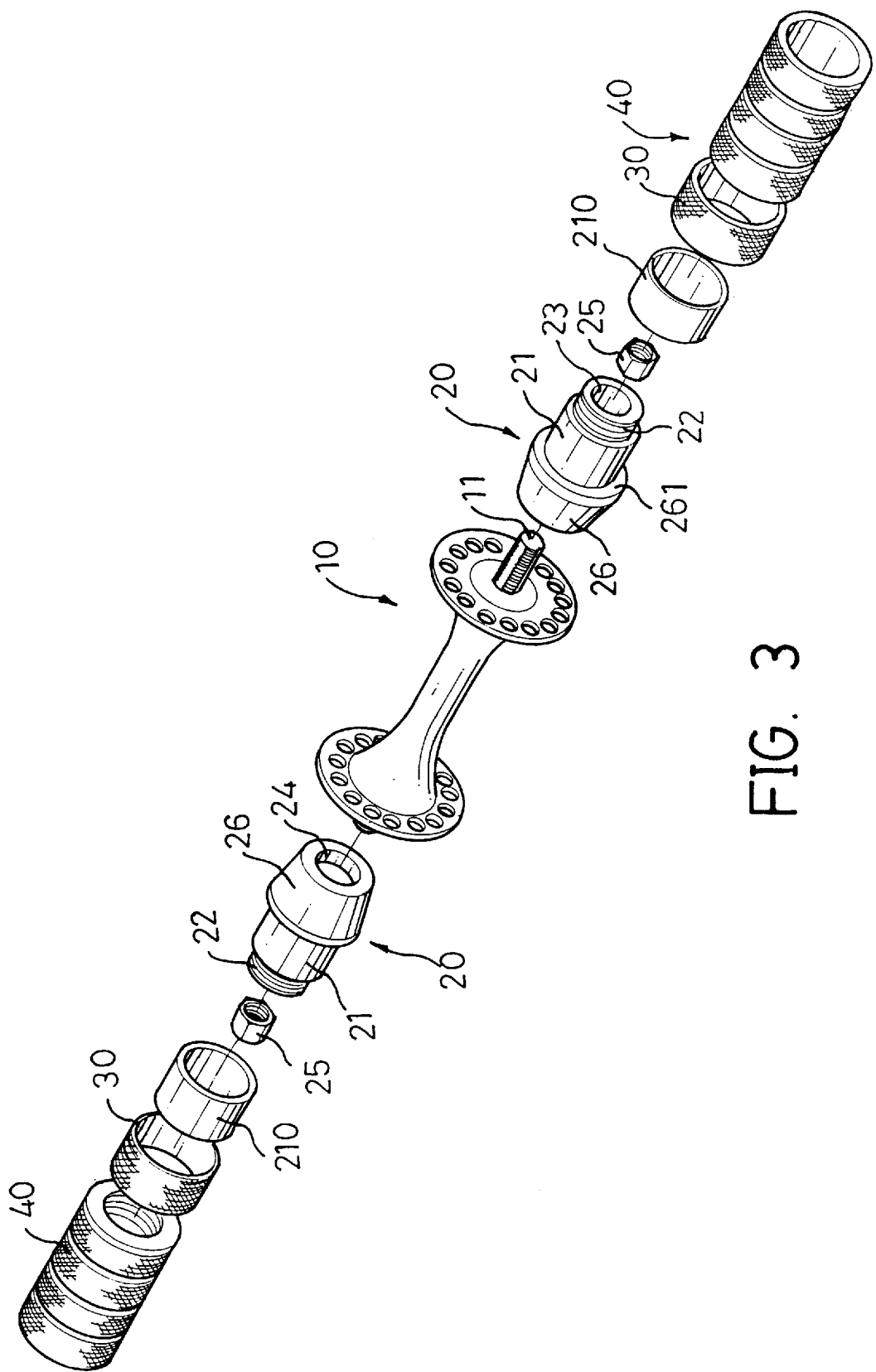
FIG. 3 is an exploded view of two sets of axle extension assembly in accordance with the present invention and a wheel hub.
Figure 4:
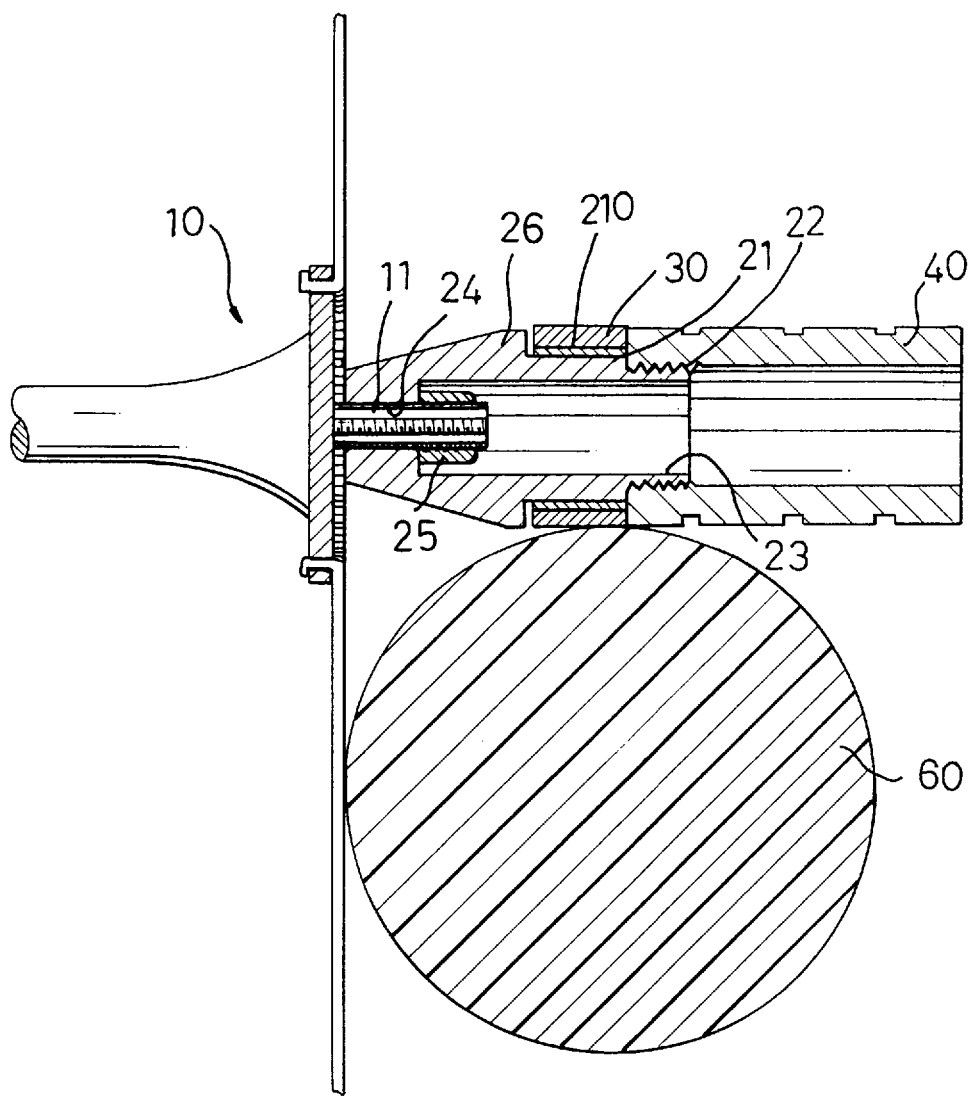
FIG. 4 is a side elevational view, partly in section, of the axle extension assembly rolling on a ramp.

Referring to FIGS. 3 and 4, a axle extension assembly in accordance with the present invention generally includes a base member 20 having a first end with a first hole 23 defined therethrough and a second end with a head portion 26 through which a second hole 24 is defined which communicates with the first hole 23. An axle 11 extends from each one of two ends of a bicycle wheel hub 10 and is inserted into the second hole 24. The first end of the base member 20 has an outer threaded periphery 22 defined thereon and the head portion 26 forms a protrusion portion 261 extending radially and outwardly from the base member 20 opposite to the outer threaded periphery 22. A nut 25 is threadedly engaged with the axle 11 so as to fixedly connect the base member 20 to the axle 11. A plain section 21 is defined between the outer threaded periphery 22 and the protrusion portion 261, and has a smooth outer periphery.

A lining ring 210 is securely mounted to the plain section 21 and is made from durable material and a ring member 30 is rotatably mounted to the lining ring 20.

A tube 40 is threadedly engaged to the outer threaded periphery 22 of the base member 20 so that the ring member 30 is rotatably retained between the tube 40 and the protrusion portion 261. The ring member 30 has an outer diameter larger than that of the tube 40 and the protrusion portion 261. The ring member 30 and the tube 40 each have a serrated outer periphery.

Accordingly, when performing a stunt with a bicycle equipped with the axle extension assembly on a ramp 60, the ring member 30 roll on the ramp 60 so that the serrated outer periphery of the ring member 30 will not be worn out rapidly. However, the tube 40 provides a secure footing when a rider stands on the assembly.

Although the invention has been explained in relation to its preferred embodiment, it is to be understood that many other possible modifications and variations can be made without departing from the spirit and scope of the invention as hereinafter claimed.

What is claimed is:

1. A axle extension assembly rotatably mounted to an axle of a wheel hub, comprising:

a base member having a first end with a first hole defined therein and a second end with a second hole defined therein which communicates with said first hole and receives said axle therein, a nut threadedly engaged with said axle so as to fixedly connect said base member to said axle, said first end of said base member having an outer threaded periphery defined therein and a plain section defined between said outer threaded periphery and said second end of said base member wherein said plain section has a smooth outer periphery, a protrusion portion extending radially and outwardly from said base member opposite to said outer threaded periphery;

a ring member rotatably mounted to said plain section of said base member, and a tube threadedly engaged to said outer threaded periphery of said base member so that said ring member is rotatably retained between said tube and said protrusion portion.

2. The axle extension assembly as claimed in claim 1 wherein said ring member has an outer diameter larger than that of said tube and said protrusion portion.

3. The axle extension assembly as claimed in claim 1 wherein a lining ring is securely mounted to said plain section and said ring member is rotatably mounted to said lining ring.

4. The axle extension assembly as claimed in claim 1 wherein said ring member has a serrated outer periphery.

5. The axle extension assembly as claimed in claim 1 wherein said tube has a serrated outer periphery.

* * * * *